United States Patent [19]
McKinnon

[11] Patent Number: 5,933,496
[45] Date of Patent: Aug. 3, 1999

[54] AA BATTERY CELLULAR PHONE

[75] Inventor: Wayne McKinnon, Georgetown, Tex.

[73] Assignee: Siemens Information and Communication Networks, Inc., Boca Raton, Fla.

[21] Appl. No.: 08/959,807

[22] Filed: Oct. 29, 1997

[51] Int. Cl.[6] ............................... H04M 1/00; H02J 7/00
[52] U.S. Cl. ..................... 379/433; 379/434; 320/110
[58] Field of Search ................................. 379/433, 434, 379/428; 455/575, 90; 320/110

[56] References Cited

U.S. PATENT DOCUMENTS

| | | | |
|---|---|---|---|
| 4,205,121 | 5/1980 | Naitoh | 429/99 |
| 5,015,546 | 5/1991 | Dulaney et al. | 429/99 |
| 5,057,761 | 10/1991 | Felegyhazi, Sr. | 320/110 |
| 5,516,306 | 5/1996 | Scrivano | 439/500 |
| 5,686,811 | 11/1997 | Bushong et al. | 320/110 |

Primary Examiner—Jack Chiang

[57] ABSTRACT

An electronic device (10) having a control circuit (12) for controlling the operation thereof and a battery compartment (14) adaptable configurable for retaining and electrically interconnecting therein either of a first battery configuration (52) and a second battery configuration (54) for providing power to the control circuit (12), the battery compartment (14) comprising a back wall (28) for supporting the battery configurations in the compartment (14), a plurality of side walls (34) extending from the back wall (28) for further supporting the battery configurations (52, 54) in the compartment, a panel (40) hingedly attached within the compartment (14), the hingedly attached panel (40) being rotatable between first and second angular positions, and a plurality of conductive elements (46) within the compartment, wherein a first of the plurality of conductive elements is disposed for physically contacting and electrically interconnecting the first battery configuration (52) when the panel is in the first angular position and a second of the plurality of conductive elements is disposed for physically contacting and electrically interconnecting the second battery configuration (54) when the panel is in the second angular position.

30 Claims, 4 Drawing Sheets

AA BATTERY CELLULAR PHONE

BACKGROUND OF THE INVENTION

The use of cellular telephones has become widespread in recent years. The convenience of carrying such telephones on one's person has increased due to improvements in the size, shape, and weight of such phones, and the growing need of people in the business community to be continuously accessible to clients and co-workers has further contributed to the increased use of cellular phones.

Most cellular phones in use today employ a rechargeable direct current power source for powering a circuit which controls the functioning of the phone. While the rechargeability of the power source often provides economic advantages in the long term as compared to a nonrechargeable power source, the typical life cycle of a rechargeable battery (i.e. the period between rechargings) tends to be somewhat shorter than that of most nonrechargeable batteries. In fact, for many users of cellular phones, recharging the power source is a frequent task which may require several continuous hours of non-use. These significant non-use periods pose a potential danger for those who rely upon a cellular phone to be operable in emergency or other critical situations. Thus, both rechargeable and nonrechargeable power sources have advantageous features lacking in other power sources. More generally, certain types of power sources have advantages and disadvantages with respect to other types of power sources, particularly with regard to issues of life span, rechargeability, size, shape, and weight of the power sources.

SUMMARY OF THE INVENTION

In order to take advantage of the various strengths and weaknesses inherent in specific types of power sources, disclosed herein is a cellular phone having a control circuit for controlling the operation of the phone and a battery compartment adaptively configurable for retaining and electrically interconnecting therein either of a first battery configuration and a second battery configuration for providing power to the control circuit. The battery compartment comprises a back wall for supporting the battery configurations in the compartment, a plurality of side walls extending from the back wall for further supporting the battery configurations in the compartment, a panel hingedly attached within the compartment, the hingedly attached panel being rotatable between first and second angular positions, and a plurality of conductive elements within the compartment, wherein a first of the plurality of conductive elements is disposed for physically contacting and electrically interconnecting the first battery configuration when the panel is in the first angular position and a second of the plurality of conductive elements is disposed for physically contacting and electrically interconnecting the second battery configuration when the panel is in the second angular position.

A cellular phone in accordance with the invention having an adaptively configurable battery compartment for retaining and electrically interconnecting therein one of multiple battery configurations achieves the advantages of all the individual battery configurations as well as providing the flexibility and safety of using an alternate power source to power the phone while a primary battery configuration recharges or until a depleted primary power source can be replaced.

DETAILED DESCRIPTION OF THE INVENTION

Figure 1:
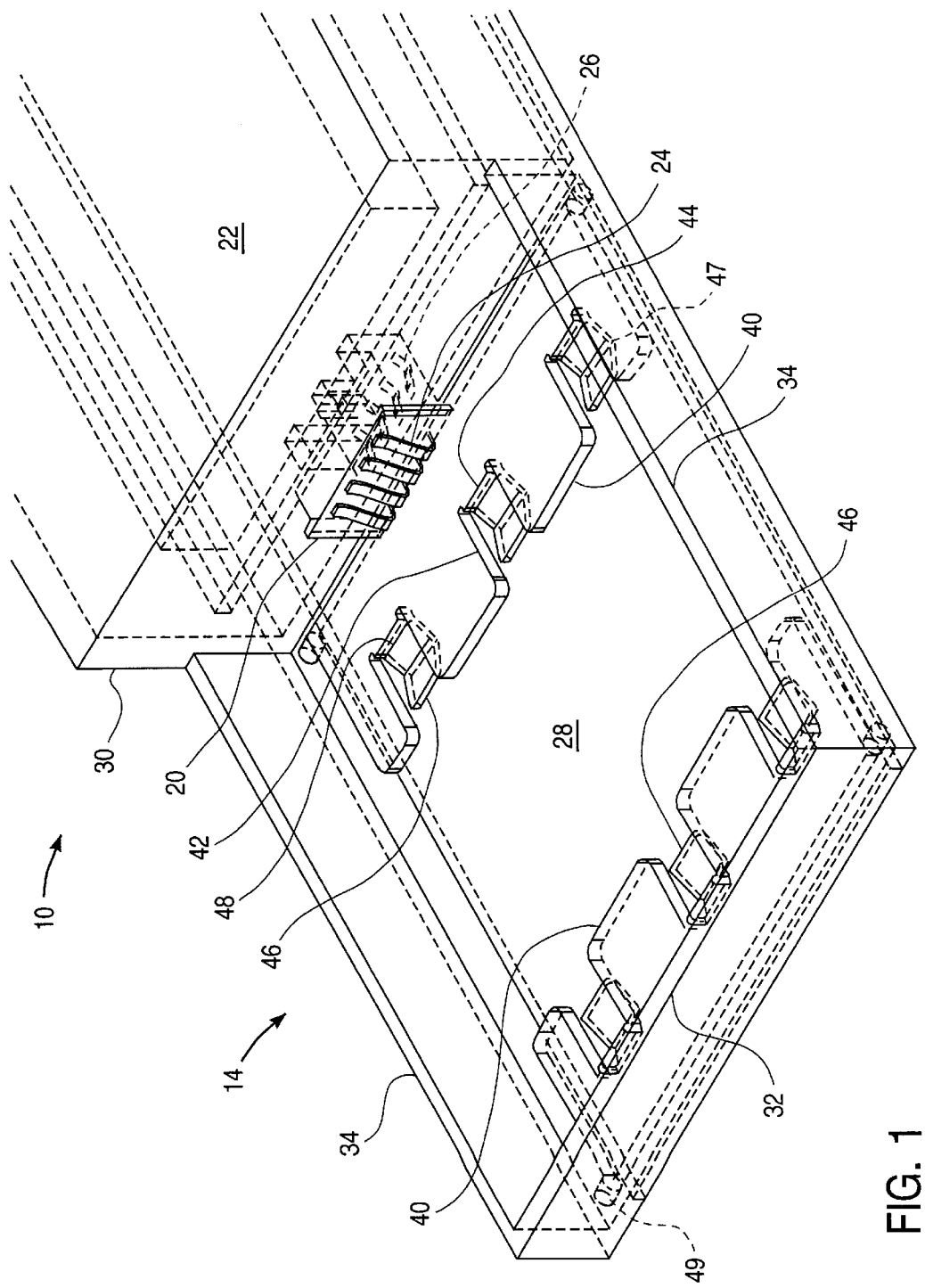
FIG. 1 is a perspective view of a battery compartment in accordance with a preferred embodiment of the invention wherein the hingedly attached panels substantially abut the back wall for accommodating therein a first battery configuration.

Referring now to the drawings, FIG. 1 shows a battery compartment 14 of a cellular phone 10 or other electronic device in accordance with an embodiment of the invention wherein the compartment 14 is adaptively configurable to retain and electrically interconnect therein one of multiple alternative battery configurations for powering the phone 10.

Figure 4:
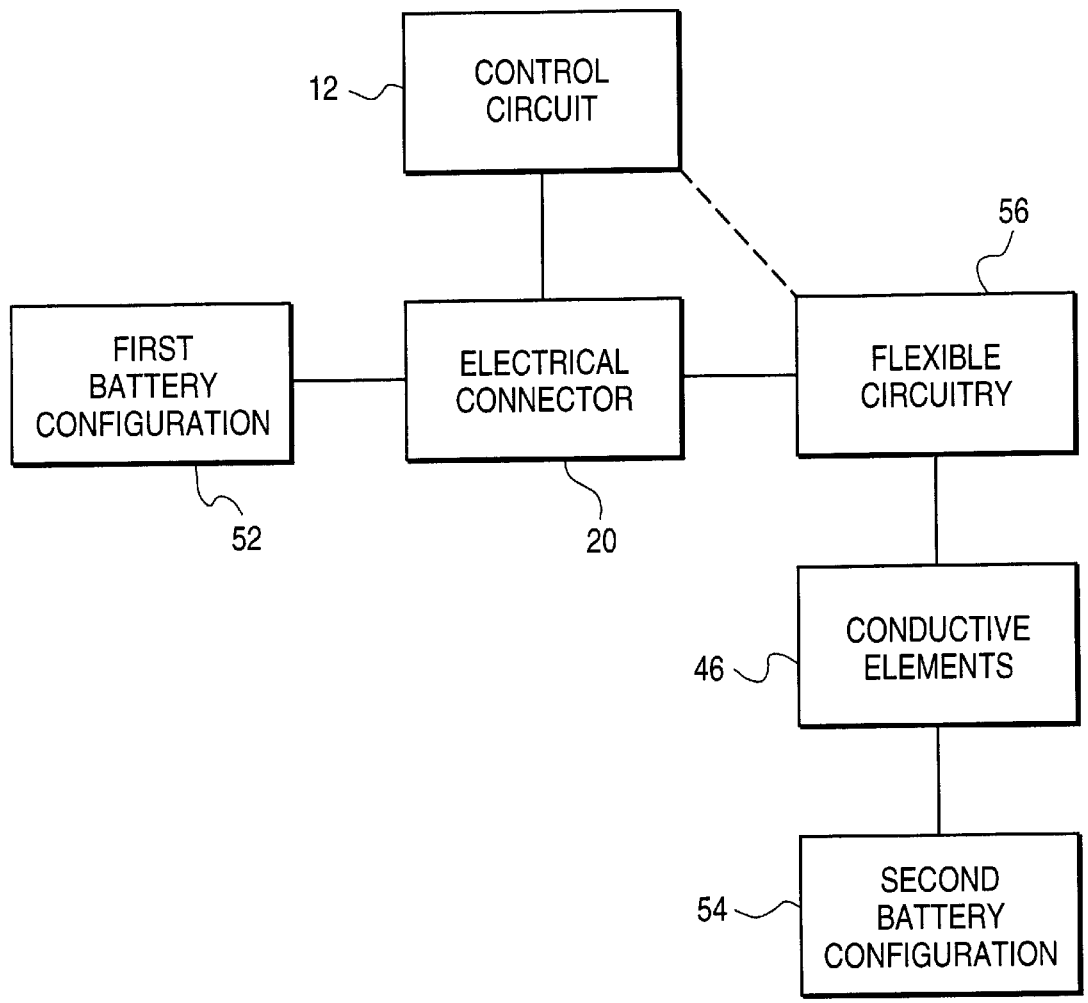
FIG. 4 is a block diagram depicting the electrical interconnections of a cellular phone in accordance with an embodiment of the invention.

More generally, the cellular phone 10 has a control circuit 12, which is shown only schematically in FIG. 4, and a battery compartment 14 for storing a direct current power source for powering the control circuit 12. The battery compartment 14 includes a generally rectangular chamber and is adaptable to receive and support therein multiple battery configurations. The battery compartment 14 has a back wall 28, a top end wall 30, a bottom end wall 32, and a pair of opposing side walls 34.

Electrical connector 20 provides electrical communication between the power source and the control circuit 12. The electrical connector 20 has a plurality of power source leads 24 which protrude from the top end wall 30 of the battery compartment toward the interior of the battery compartment 14 and provide electrical interconnection with a first battery configuration 52 (as seen in FIG. 4). The electrical connector 20 also has control circuit leads 26 extending from the housing 21 of the electrical connector into the interior of the cell phone 10, the leads 26 being electrically interconnected to the control circuit 12. By these electrical interconnections, the electrical connector 20 provides electrical intercommunication between the first battery configuration 52 and the control circuit 12.

Inside the battery compartment 14, a pair of panels 40 are hingedly attached at a pair of oppositely disposed protruding knobs 49, and the panels 40 are rotatable about axes defined by the protruding knobs 49. The protruding knobs 49 extend into appropriately located knob-receiving recesses 50 in the side walls 34. It is noted that other hinge configurations may be provided, such as via a rod extending the length of the panels 40 having ends disposable within the recesses 50. In addition, spring or biasing members (not shown) may be provided to relatively secure the panels with first or second angular positions, as will be discussed in greater detail below. The recesses 50 may be appropriately shaped depressions or grooves along the inner side wall surfaces.

Figure 2:
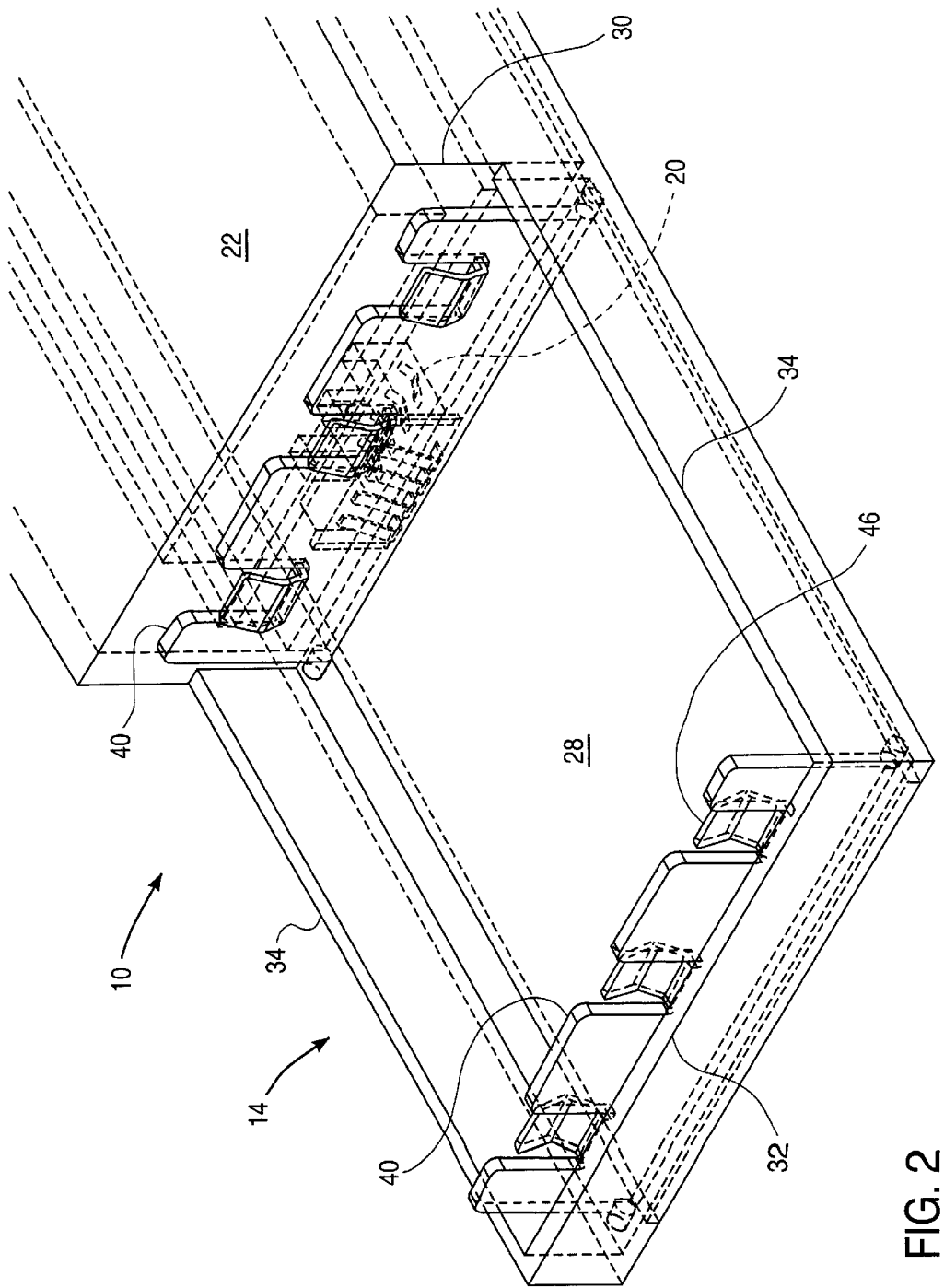
FIG. 2 is a perspective view of the battery compartment of FIG. 1 wherein the hingedly attached panels substantially abut their respective end walls for accommodating therein a second battery configuration in accordance with the invention.

The panels 40 are rotatable between first angular positions substantially abutting the back wall 28 and second angular positions substantially abutting one of the respective end walls 30 and 32. In the described embodiment, and as seen in contrasting FIGS. 1 and 2, first and second angular positions are substantially 90° apart with respect to the axes defined by the protruding knobs 49. The panels may be rotatable manually, as in the embodiment depicted herein, or an appropriate lever, switch or other mechanism may be employed to rotate the panels from one of the angular positions to the other.

The panels 40 may be substantially rectangular plates having three conductive elements 46 disposed thereon and projecting substantially out of the plane of the plate to facilitate physically contacting and electrically interconnecting at least one of the battery configurations. The conductive elements 46 are distributed along the length of the panels 40 to permit, in the embodiment shown in FIG. 3, substantially parallel placement of longitudinally noded batteries therebetween when the panels 40 are in the second angular position.

The panels 40 have cut-away notches 42 along one side thereof to allow placement of the conductive elements 46 along appropriate edges 44 of the notches 42. In the described embodiment, each panel 40 has three such notches 42 to correspond with the number of conductive elements 46 placed along the respective panels 40 and the number of cylindrical batteries to be accommodated therebetween.

The conductive elements 46 may be single, substantially rectangular plates which may be transversely bent along an edge 47 to form, for example, an obtuse dihedral angle. A connective edge 48 of each substantially rectangular conductive element 46 is attached to the panel 40 along a corresponding cut-away edge 44, and the conductive element 46 is oriented such that the dihedral edge 47 is bent away from the end walls 30 and 32 when the panels 40 are in their second angular position. The conductive elements 46 project slightly inwardly from the panels 40 when the panels are in their second angular position to facilitate contact between the conductive elements 46 and the nodes of a particular battery configuration disposed within the battery compartment 14. When the panels 40 are in their first angular position, the dihedral edges 47 are bent toward the back wall 28 so as to avoid interference with the power source accommodated by the battery compartment 14.

The conductive elements 46 may be electrically connected to electrical connector 20 to provide ultimate electrical communication with the control circuit 12 or the conductive elements 46 may be directly wired to the control circuit 12, bypassing electrical connector 20. The electrical communication in either case may be achieved through flexible circuitry 56 within the within the battery compartment 14.

Thus, although some electrical interconnection apparatus may be used for electrically interconnecting both the first and second battery configurations respectively to the control circuit, it is clear that the conductive elements directly contacting the particular battery configurations (in the described embodiment, the power source leads 24 for interconnecting the first battery configuration, and the panel conductive elements 46 for interconnecting the second battery configuration) may well be distinct. In particular, it is contemplated that one set of conductive elements may exclusively interconnect the first battery configuration while another set of conductive elements may exclusively interconnect the second battery configuration. Of course, it is also possible that one or more conductive elements may be employed in interconnecting both battery configurations.

To replace a first battery configuration with a second battery configuration, one removes the first battery configuration from the battery compartment 14, rotates the two hinged panels 40 about the axes defined by their respective protruding knobs 49 from a first angular position wherein the panels 40 substantially abut the back wall 28 of the battery compartment 14 to a second angular position wherein the hinged panels 40 substantially abut end walls 30 and 32. The second battery configuration is then inserted into the battery compartment 14 such that the second battery configuration is in electrical intercommunication with the control circuit 12 via the conductive elements 46.

The described embodiment employs for its first battery configuration a single battery pack, such as a standard 6V nickel-cadmium or hydride power supply, which fits into the battery compartment 14 atop the panels 40 when they are substantially abutting the back wall 28 of the battery compartment 14. The battery pack directly contacts the electrical connector 20 to supply power to the control circuit 12. The battery pack of the first battery configuration may be rechargeable, such as a nickel-cadmium battery.

Figure 3:
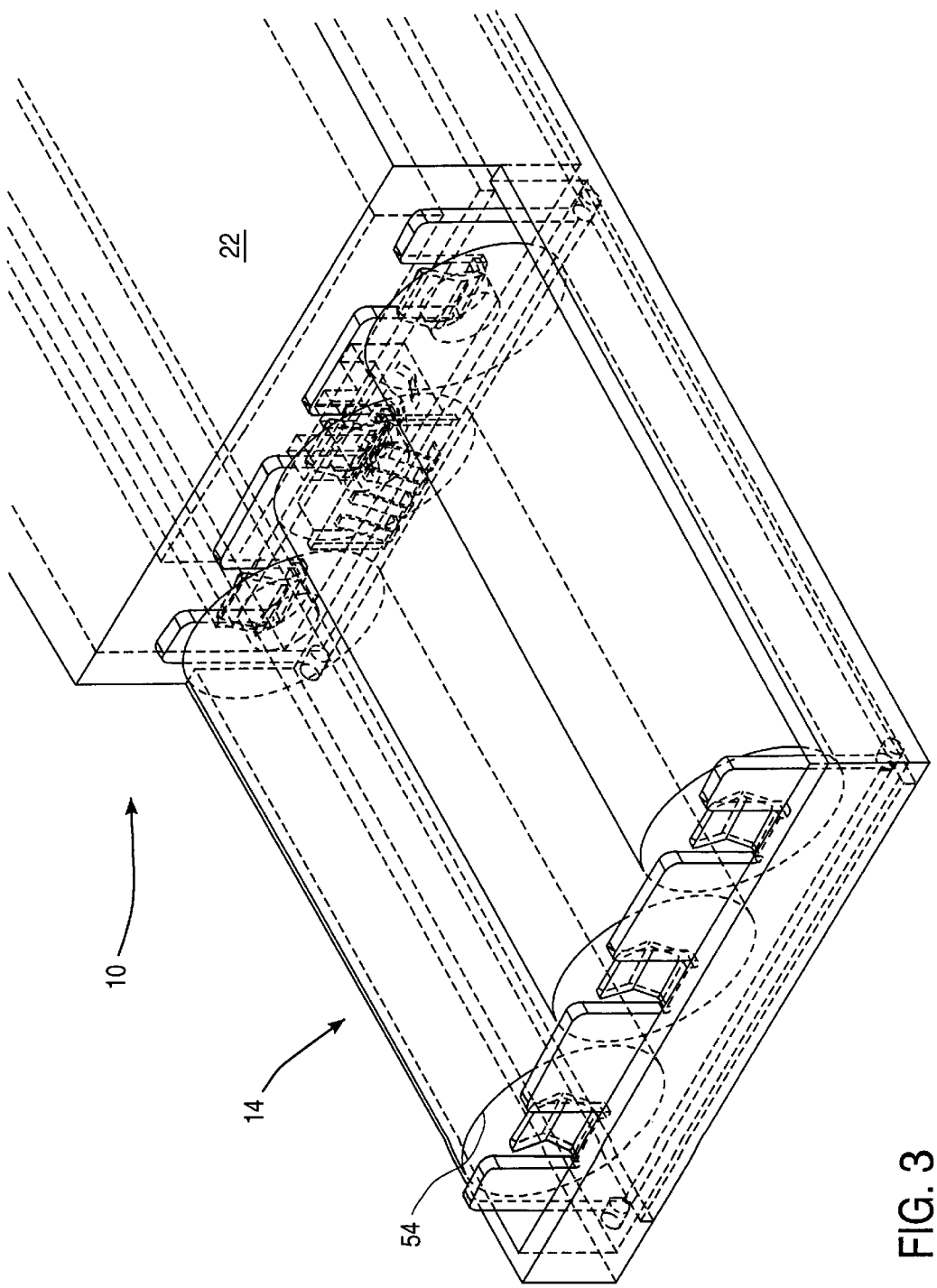
FIG. 3 is a perspective view of the battery compartment shown in FIG. 1 with panels oriented as shown in FIG. 2 wherein a second battery configuration is shown retained in the battery compartment.

The second battery configuration (shown in FIG. 3) may be a set of three AA cylindrical batteries electrically connected serially. As commonly known, AA cylindrical batteries have opposite, axially aligned nodes representing a voltage differential at opposite ends of the cylindrical casings of the batteries. As seen in FIG. 3, the cylindrical AA batteries are disposed side-by-side within the battery compartment 14. The AA batteries may alternate in longitudinal direction relating to their respective voltage differentials in order to minimize the required amount of flexible circuitry 56 (shown schematically in FIG. 4) to electrically interconnect the AA batteries serially. The flexible circuitry may, for example, be a segment of ribbon cable or circuitry printed onto a flexible substrate.

FIG. 4 schematically depicts the electrical interconnections of a cellular phone in accordance with the described embodiment of the invention. In particular, the first battery configuration 52 is in electrical intercommunication with the electrical connector 20 which, in turn, are in electrical intercommunication with the control circuit 12. Meanwhile, the second battery configuration 54 directly contacts or is in electrical intercommunication with conductive elements 46 which, via flexible circuitry 56, are in electrical intercommunication with either the control circuit 12 directly or the electrical connector 20 which itself is in electrical intercommunication with the control circuit 12. This latter sequence of interconnections is shown through solid lines while the former is shown schematically with a broken line in FIG. 4. In the described embodiment, the control circuit 12 is capable of determining which of said first and second battery configurations is electrically interconnected within the battery compartment 14.

From the foregoing, it will be appreciated that the invention provides a novel cellular phone, and in particular a novel battery compartment within a cellular phone or electronic device, adaptable for accommodating multiple battery configurations. The invention is not limited to the embodiments described herein, or to any particular embodiments. Specific examples of alternative embodiments considered to be within the scope of the invention include embodiments wherein the battery compartment is not substantially rectangular, wherein only one panel is hingedly attached within the battery compartment, wherein either or both of the battery configurations are rechargeable or nonrechargeable, or include single or multiple cells, and wherein the means by which battery configurations are placed in electrical intercommunication with the control circuit does not conform to that shown in FIG. 4. Other modifications to the described embodiments may also be made within the scope of the invention. The invention is defined by the following claims.

What is claimed is:

1. An electronic device having a control circuit for controlling the operation of said electronic device and a battery compartment adaptively configurable for retaining and electrically interconnecting therein either of a first battery configuration and a second battery configuration for providing power to said control circuit, said battery compartment comprising:

a back wall for supporting said battery configurations in said compartment;

a plurality of side walls extending from said back wall for further supporting said battery configurations in said compartment;

a panel hingedly attached within said compartment, said hingedly attached panel being rotatable between first and second angular positions; and a plurality of conductive elements within said compartment, wherein a first of said plurality of conductive elements is disposed for physically contacting and electrically interconnecting said first battery configuration when said panel is in said first angular position and a second of said plurality of conductive elements is disposed for physically contacting and electrically interconnecting said second battery configuration when said panel is in said second angular position.

2. An electronic device in accordance with claim 1 comprising a pair of opposing end walls and a pair of opposing side walls substantially perpendicularly disposed with respect to said end walls, said end walls and side walls mutually defining a substantially rectangular perimeter of said compartment.

3. An electronic device in accordance with claim 2 comprising a pair of panels hingedly attached within said compartment, each of said panels being attached substantially along one of said opposing end walls.

4. An electronic device in accordance with claim 3 wherein each of said panels comprises a substantially rectangular plate having at least one conductive element projecting substantially out of the plane of the plate to facilitate physically contacting and electrically interconnecting at least one of said battery configurations.

5. An electronic device in accordance with claim 4 wherein one of said conductive elements in said battery compartment is substantially disposed on one of said end walls of said compartment.

6. An electronic device in accordance with claim 5 wherein said first and second angular positions are substantially 90° apart with respect to said hinged attachment, each of said panels substantially abutting said back wall when in said first angular position and each of said panels substantially abutting one of said end walls when in said second angular position.

7. An electronic device in accordance with claim 1 wherein said second battery configuration comprises a plurality of cylindrical batteries disposed in side-by-side fashion.

8. An electronic device in accordance with claim 1 wherein said second of said plurality of conductive elements is electrically interconnected to said first of said plurality of conductive elements by a length of flexible circuitry therebetween.

9. An electronic device in accordance with claim 1 wherein said control circuit is capable of determining which of said first and second battery configurations is electrically interconnected thereto.

10. A battery compartment for controlling a control circuit of an electronic device, said compartment being adaptively configurable for retaining and electrically interconnecting therein either of a first battery configuration and a second battery configuration for providing power to said control circuit, said battery compartment comprising:

a back wall for supporting said battery configurations in said compartment;

a plurality of side walls extending from said back wall for further supporting said battery configurations in said compartment;

a panel hingedly attached within said compartment, said panel being rotatable about said hinged attachment between first and second angular positions; and a plurality of conductive elements within said compartment, wherein one of said plurality of conductive elements is disposed for physically contacting and electrically interconnecting said first battery configuration when said panel is in said first angular position and another of said plurality of conductive elements is disposed for physically contacting and electrically interconnecting said second battery configuration when said panel is in said second angular position.

11. A battery compartment in accordance with claim 10 comprising a pair of opposing end walls and a pair of opposing side walls substantially perpendicularly disposed with respect to said end walls, said end walls and side walls mutually defining a substantially rectangular perimeter of said compartment.

12. A battery compartment in accordance with claim 11 comprising a pair of panels hingedly attached within said compartment, each of said panels being attached substantially along one of said opposing end walls.

13. A battery compartment in accordance with claim 12 wherein each of said panels comprises a substantially rectangular plate having at least one conductive element projecting substantially out of the plane of the plate to facilitate physically contacting and electrically interconnecting at least one of said battery configurations.

14. A battery compartment in accordance with claim 13 wherein one of said conductive elements is substantially disposed on one of said end walls.

15. A battery compartment in accordance with claim 14 wherein said first and second angular positions are substantially 90° apart with respect to said hinged attachment, each of said panels substantially abutting said back wall when in said first angular position and each of said panels substantially abutting one of said end walls when in said second angular position.

16. A battery compartment in accordance with claim 10 wherein said second battery configuration comprises a plurality of cylindrical batteries disposed in side-by-side fashion.

17. A battery compartment in accordance with claim 10 wherein said second of said plurality of conductive elements is electrically interconnected to said first of said plurality of conductive elements by a length of flexible circuitry therebetween.

18. A battery compartment in accordance with claim 10 wherein said control circuit is capable of determining which of said first and second battery configurations is electrically interconnected thereto.

19. A method for changing the battery configuration within a battery compartment of an electronic device from a first battery configuration to a second battery configuration wherein said battery compartment is adaptively configurable for retaining and electrically interconnecting either of said battery configurations therein for providing power to a control circuit for said electronic device, said battery compartment having a panel hingedly attached within said compartment and rotatable about a hinged attachment between first and second angular positions, said method comprising the following steps:

removing said first battery configuration from said battery compartment;

rotating said panel about said hinged attachment from said first angular position to said second angular position; and inserting said second battery configuration into said battery compartment such that said second battery configuration is in electrical intercommunication with said control circuit.

20. A method for changing the battery configuration within a battery compartment of a cellular phone from a first battery configuration to a second battery configuration wherein said battery compartment is adaptively configurable for retaining and electrically interconnecting either of said battery configurations therein for providing power to a control circuit for said cellular phone, said second battery configuration comprising a plurality of cylindrical battery cells having a pair of nodes axially aligned at opposite ends of respective cells, said battery compartment having a back wall, a pair of opposing end walls and a pair of panels hingedly attached within said compartment, each of said panels being attached substantially along one of said opposing end walls, each of said panels having first and second angular positions, said first angular positions wherein said panels substantially abut said back wall and said second angular positions wherein said panels substantially abut their respectively associated end walls, each of said panels having thereon a plurality of conductive elements, said method comprising the following steps:

removing said first battery configuration from said battery compartment;

rotating each of said panels from its first angular position to its second angular position;

inserting each of said plurality of battery cells into said battery compartment such that each of said cell has one of its opposing nodes contacting one of said plurality of conductive elements on one of said panels and the other of its opposing nodes contacting another one of said plurality of conductive elements on said other of said panels.

21. A battery compartment for an electronic device, the battery compartment comprising:

a battery chamber, said battery chamber having rotatable panels adapted to rotate between a first position and a second position, said chamber configured to accept at least one battery of a first type when said panels are in said first position and to accept at least one battery of a second type when said panels are in said second position;

first electrical coupling means for coupling said at least one battery of said first type to said electronic device when said rotatable panels are in said first position; and second electrical coupling means for coupling said at least one battery of said second type to said electronic device when said panels are in said second position.

22. A battery compartment as recited in claim 21, wherein said battery chamber includes a pair of rotatable panels disposed at opposite ends of said battery chamber.

23. A battery compartment as recited in claim 21, wherein said first and second positions are substantially 90° apart from one another.

24. A battery compartment as recited in claim 21, wherein said first electrical coupling means is disposed on an end of said battery chamber adjacent at least one of said rotatable panels.

25. A battery compartment as recited in claim 21, wherein said second electrical coupling means is disposed on at least one of said rotatable panels.

26. A battery compartment as recited in claim 25, wherein said second electrical coupling means is configured to project substantially out of a plane of at least one of said panels to facilitate interconnecting of said at least one battery of said second type when said rotatable panels are in said second position.

27. A battery compartment as recited in claim 23, wherein said first position is substantially parallel to a bottom of said battery chamber.

28. A battery compartment as recited in claim 24, wherein said second position is substantially parallel to an end wall of said battery chamber.

29. A battery compartment according to claim 21, wherein said at least one battery of said first type is a rechargeable battery.

30. A battery compartment according to claim 21, wherein said at least one battery of a second type is a nonrechargeable battery.

* * * * *